Figure 1:
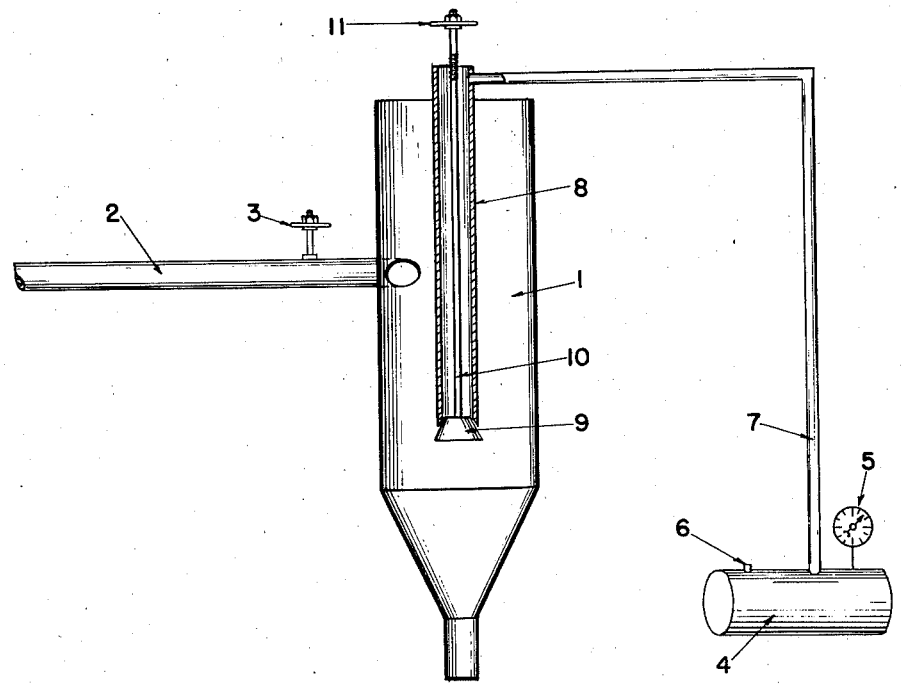

Dec. 8, 1942.  J. R. SPELLACY  2,304,429
CASEIN MANUFACTURE
Filed March 28, 1939

John R. Spellacy
INVENTOR

Cleveland B. Hulldaugh
ATTORNEY

Patented Dec. 8, 1942

2,304,429

UNITED STATES PATENT OFFICE 2,304,429

CASEIN MANUFACTURE

John R. Spellacy, Burlingame, Calif., assignor to Hercules Powder Company, Wilmington, Del., a corporation of Delaware Application March 28, 1939, Serial No. 264,524

4 Claims. (Cl. 260—120)

This invention relates to a method of precipitating casein from skim milk and more particularly relates to a method of precipitating casein from skim milk with use of concentrated acids as precipitants.

As is well known, casein is produced in large quantities by addition of dilute acids to skim milk. According to the so-called "grain-curd" process the casein is first precipitated from skim milk by adding a dilute acid to the latter in a heated condition and then permitting the curd to remain in the whey for a sufficient period of time to complete the reaction and produce granulation of the curd. The methods of introducing dilute acid into the milk, as practised in the art, do not permit sufficiently uniform and intimate admixture of the acid with the milk to make it possible to utilize concentrated acids in a similar manner. It has been known that concentrated acids cause burning or loss of curd through solution in the acid and for this reason, they have been carefully avoided.

One object of this invention is to provide a method by which casein may be precipitated from skim milk with use of concentrated acids without burning the curd.

A further object is to provide a method of producing a granular type of curd with very much shorter contact of the curd with the acid than has been heretofore possible.

Another object is to provide a simpler, more efficient and more economical method of preparing acid precipitated casein from skim milk.

These objects are accomplished, in accordance with this invention, by spraying concentrated acids into skim milk under pressure in the form of a very fine spray or film. Due to the fineness of the spray, such complete and thorough mixing of the acid with the milk occurs as to prevent the burning of the curd or other damage thereto by unsatisfactory contact between the concentrated acid and the curd. Moreover, as a result of the intimate mixing of the concentrated acid with the milk, the curd becomes granulated during the precipitation, whereas heretofore it has been necessary to permit contact of the curd with the acid for a period after precipitation to promote granulation.

Fig. 1 is a plan view of an apparatus for carrying out the invention. It is to be understood that the method of the invention is not confined to operation in the apparatus of the drawing, but that such apparatus is shown only as a convenient device for carrying out the invention.

The mixing chamber 1 is constructed of acid-proof material, such as, for example, stoneware or acid resistant metal and is preferably in cylindrical form. Its size will depend on the scale of operation desired. A convenient size for commercial use would have a diameter of about 2 inches and a length of about 12 inches. At the lower end the mixing chamber is constricted to smaller size. The preheated skim milk enters the mixing chamber 1 through pipe line 2, the flow being controlled and regulated by valve 3 in said line. Acid tank 4 is constructed of acid resistant material to withstand a pressure of at least 100 lbs. per sq. in. It is provided with pressure gauge 5, opening 6 for application of pressure and outlet line 7. The latter is connected to acid feed line 8 extending from the top of mixing chamber 1 down through the latter to a point well below the milk feed line 2. The bottom outlet of acid feed line 8 inside the mixing chamber is provided with a valve consisting of a disc or seat 9 controlled through a long valve stem 10 extending through acid feed line 8 and valve handle 11 at the end of said valve stem.

The disc 9 is preferably sloped to permit the acid to be forced out in a fan-shaped fine film directed toward the sides of the mixing chamber. The valve constructed as shown permits the maintenance of a constant pressure on the disc of the valve irrespective of the amount of acid flowing through the valve, and thus insures a fine spray of acid regardless of the quantity of acid passing through the valve.

In carrying out the invention, concentrated acids are injected under pressure into a rapidly moving stream of skim milk heated to the desired degree through a spray device or nozzle which allows the acid to leave in a very fine spray or film. The concentrated acid is thereby forced into intimate admixture with the milk immediately on contact therewith. As a result of the intimate mixing the concentrated acid does not burn or dissolve the curd or cause other injury to the latter. The resulting curd is separated from the whey as soon after precipitation as possible for maximum results. The separated curd is then washed thoroughly as soon as possible after the separation of the whey to prevent loss of any curd by solution in the whey retained by the curd.

In the preferred method, the preheated skim milk at a temperature of about 90° F. to about 125° F. is introduced into the mixing chamber 1 in the accompanying drawing either by gravity or other means. The milk swirls around the sides of the mixing chamber in rapid manner and passes through the fine film or spray of concentrated acid issuing under pressure from the acid feed line 8, through the spray nozzle 9. Immediate thorough mixing of the concentrated acid with the milk takes place. With proper setting of the valve 3 in the milk feed line and proper adjustment of the acid regulating valve the operation may be carried out in a continuous manner with the curd and whey resulting from contact of the acid with the milk separating immediately after leaving the mixing chamber. The curd and whey may then be separated as described above and the curd washed with water.

The temperature at which the precipitation is carried out will depend entirely on the type of casein desired. It is well known that the ash content is higher when higher temperatures are employed. In the so-called "grain-curd" process a temperature of about 90° F. to 95° F. is usually used and the ash content of the casein resulting is relatively low. In the ordinary vat process the milk is treated with acid at a temperature of about 120° F. to 125° F. and the casein resulting has relatively higher ash content.

According to the process of the present invention, the temperature of the skim milk entering the mixing chamber will lie within the range of about 90° to about 125° F. depending on the type of casein desired. It is known that with the use of lower temperatures the curd is more granular and lends itself more readily to washing.

The concentrated acids useful in the present invention may be any of the acids usually used in precipitating casein in concentrated form, such as, for example, hydrochloric acid, sulfuric acid, lactic acid, etc.

The precipitation of casein with concentrated acids has several distinct advantages. Thus, the step of dilution of acid with water necessary in prior procedures is eliminated. Furthermore, dilute acids are much more corrosive to metals than concentrated acids and have necessitated use of acid-proof containers, valves, fittings, etc., all of which may be eliminated by my procedure. The smaller amount of water introduced into the whey by use of concentrated acid is of advantage when the whey is evaporated in the manufacture of condensed or dried whey. Another advantage is the immediate graining of the curd in the precipitation, thereby providing a simplicity and economy of operation.

Although I have described my improved method of precipitating casein in detail, it will be understood that the details and examples are illustrative only, and that the invention as broadly described is in no way limited thereby.

What I claim and desire to protect by Letters Patent is:

1. A process for the precipitation of casein which comprises spraying concentrated acid on a rapidly moving swirling thin stream of skim milk.

2. A process for the precipitation of casein which comprises spraying a thin film of concentrated acid under pressure into a rapidly moving swirling thin stream of skim milk.

3. A process for the precipitation of casein which comprises spraying a thin film of concentrated acid under pressure into a rapidly moving swirling thin stream of skim milk heated to between 90 and 125° F.

4. A process for the precipitation of casein which comprises spraying a thin film of concentrated sulfuric acid under pressure into a rapidly moving swirling thin stream of skim milk.

JOHN R. SPELLACY.